United States Patent [19]
Burk, Jr. et al.

[11] 4,267,032
[45] May 12, 1981

[54] DEMETALLIZATION PROCESS FOR A CONVERSION CATALYST

[75] Inventors: Emmett H. Burk, Jr., Glenwood; Jin S. Yoo, Flossmoor; John A. Karch, Chicago; Jui-Yuan Sun, South Holland, all of Ill.

[73] Assignee: Atlantic Richfield Company, Philadelphia, Pa.

[21] Appl. No.: 81,724

[22] Filed: Oct. 4, 1979

Related U.S. Application Data

[63] Continuation-in-part of Ser. No. 58,346, Jul. 17, 1979, which is a continuation-in-part of Ser. No. 840,875, Oct. 11, 1977, abandoned, which is a continuation-in-part of Ser. No. 695,602, Jun. 14, 1976, Ser. No. 695,662, Jun. 14, 1976, Pat. No. 4,101,444, Ser. No. 695,687, Jun. 14, 1976, Pat. No. 4,102,811, and Ser. No. 756,581, Jan. 3, 1977.

[51] Int. Cl.³ .................... C10G 11/00; C10G 11/05; B01J 21/20; B01J 29/38
[52] U.S. Cl. .................... 208/113; 208/120; 252/411 R; 252/411 S; 252/412; 252/413; 252/416; 252/420
[58] Field of Search .................... 252/413, 412, 411 S, 252/416, 419, 420, 411 R; 208/113, 120

[56] References Cited

U.S. PATENT DOCUMENTS

| | | | |
|---|---|---|---|
| 2,704,281 | 3/1955 | Appell | 252/413 |
| 3,147,228 | 9/1964 | Erickson | 252/412 |
| 3,148,155 | 9/1964 | Schwartz | 252/413 |
| 3,173,882 | 3/1965 | Anderson | 252/413 |
| 3,324,044 | 6/1967 | Oberhofer | 252/413 |
| 3,923,689 | 12/1975 | Broughton et al. | 252/413 |

*Primary Examiner*—P. E. Konopka
*Attorney, Agent, or Firm*—Stanley M. Welsh

[57] ABSTRACT

Disclosed is an aqueous phase oxidation for removing at least a portion of metal contaminants such as nickel, vanadium, iron or copper from a catalyst used in a hydrocarbon conversion process. The aqueous phase oxidation comprises: contacting a sulfided metals contaminated catalyst with an aqueous solution comprising soluble metal nitrate ions and a catalytically effective concentration of nitrite ions. Optionally, the sulfided catalyst which has been oxidized can be further treated with an aqueous oxidative and/or reductive wash. The oxidative wash preferably follows the reductive wash for optimal results.

11 Claims, No Drawings

DEMETALLIZATION PROCESS FOR A CONVERSION CATALYST

CROSS REFERENCE TO RELATED APPLICATIONS

This application is a continuation-in-part of an application, Ser. No. 058,346, filed July 17, 1979 (still pending) which is in turn a continuation of an application, Ser. No. 840,875, filed Oct. 11, 1977, now abandoned which is in turn a continuation-in-part of applications, Ser. Nos. 695,602 (still pending), 695,662 (now issued as U.S. Pat. No. 4,101,444), and 695,687 (now issued as U.S. Pat. No. 4,102,811) all filed on June 14, 1976, and an application, Ser. No. 756,581, filed Jan. 3, 1977 (still pending), the teachings of which are incorporated by reference herein.

BACKGROUND OF THE INVENTION

This invention relates to a process for the removal of metal poisons or contaminants from a hydrocarbon conversion catalyst which has been contaminated with one or more metal poisons or contaminants by use in a high temperature catalytic conversion of hydrocarbon feedstocks containing such metals or contaminants. More particularly, this invention relates to an improved method for removing metal contaminants from a hydrocarbon conversion catalyst. The invention may be used as part of an overall metals-removal process employing a plurality of processing steps to remove a significant amount of one or more of nickel, vanadium, copper, and iron metals contained in a poisoned catalyst.

Catalytically promoted methods for the chemical conversion of hydrocarbons include cracking, hydrocracking, reforming, hydrodenitrogenation, hydrodesulfurization, etc. Such reactions generally are performed at elevated temperatures, for example, about 300° to 1200° F., more often 600° to 1000° F. Feedstocks to these processes comprise normally liquid and solid hydrocarbons which, at the temperature of the conversion reaction, are generally in the fluid, i.e., liquid or vapor state, and the products of the conversion usually are more valuable, lower boiling materials.

In particular, cracking of hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750° to 1100° F., preferably about 850° to 950° F., at pressures up to about 2000 psig., preferably about atmospheric to 100 psig. and without substantial addition of free hydrogen to the system. In cracking, the feedstock is usually a petroleum hydrocarbon fraction such as straight run or recycle gas oils or other normally liquid hydrocarbons boiling about the gasoline range. Recently, low severity cracking conditions have been employed for heavily contaminated feedstocks such as crude or reduced crude where the conversion is not made directly to the most valuable, lower boiling products, i.e., gasoline boiling range products, but to intermediate type hydrocarbon conversion products which may be later refined to the more desirable, lower boiling, gasoline or fuel oil fractions. High severity cracking has also been practiced for the conversion of such feedstocks to light, normally gaseous hydrocarbons, such as ethane, propane or butane.

The present invention relates to the improvement of catalyst performance in hydrocarbon conversion where metal poisoning occurs. Although referred to as "metals," these catalyst contaminants may be present in the hydrocarbon feed in the form of free metals or relatively non-volatile metal compounds. It is, therefore, to be understood that the term "metal" as used herein refers to either form. Various petroleum stocks have been known to contain at least traces of many metals.

Some patents exemplifying some of the state of the art in this area are discussed hereinafter and the teachings of which are expressly incorporated herein by reference.

U.S. Pat. No. 2,668,798 (1954) of C. J. Plank discloses a process for overcoming poisonous affects of nickel contamination on the conversion efficiency of siliceous cracking catalysts by subjecting such catalysts to a mild acid treatment followed by a mild steam treatment. The acid used may be either a mineral acid such as sulfuric, nitric, hydrochloric, phosphoric and the like, or an organic acid such acetic, oxalic, tartaric and the like.

U.S. Pat. No. 3,122,497 (1964) of H. Erickson discloses a process to remove metal poisons from a synthetic gel hydrocarbon conversion catalyst. Metals to be removed are one or more of nickel, vanadium and iron. Nickel is especially removed in the process. The process disclosed involved sulfiding a regenerated catalyst and then converting sulfided components of the poison catalyst such a nickel sulfide to a volatile or water dispersible nickel compound. Among the methods for converting a sulfided component to water dispersible material is a liquid aqueous oxidizing medium, such as dilute hydrogen peroxide or hypochlorous acid water solutions, including sulfuric acid or nitric acid to reduce consumption of peroxide, aerated dilute nitric acid solutions in water, sodium peroxide in acid solutions such as chromic acid, solutions of manganates, permanganates, chlorites, chlorates, perchlorates, bromites, bromates, perbromates, iodites, iodates and periodates, bromine or iodine water, an aerated, ozonated or oxygenated water with or without acid. Not disclosed is the use of nitrate ions catalyzed by nitrite ions to oxidize sulfided components of a sulfided catalyst.

U.S. Pat. Nos. 3,122,510, 3,122,511 and 3,122,512 disclose a process for the removal from a solid oxide hydrocarbon conversion catalyst metals such as nickel, vanadium, and iron. The process involves regenerating a carbonaceous coated conversion catalyst which has been contaminated by metal contaminants such as nickel, vanadium, and iron followed by sulfidation and finally followed by a chlorination. Chloriding of the sulfided catalyst is carried out to convert sulfided metal contaminants to a water dispersible form.

U.S. Pat. No. 3,123,548 (1964) of J. E. Connor, Jr. discloses the use of a cation exchange resin in conjunction with an oxidation of a sulfided cracking catalyst. The sulfided catalyst is air oxidized to convert sulfided components to water dispersible forms of metal contaminants.

U.S. Pat. No. 3,146,188 (1964) of E. C. Gossett discloses a process for cracking a residual oil containing metallic impurities. Vis-breaking operating conditions are employed during the cracking process. The contaminated catalyst is disclosed to remove contaminating metals by, in one instance, converting a sulfide component to a water dispersible form.

U.S. Pat. No. 3,147,209 (1964) of H. Erickson discloses sulfiding a previously regenerated catalyst containing metal contaminants and contacting the sulfided catalyst with an oxygen-containing gas-steam mixture to convert any metal sulfides to water-dispersible materials.

U.S. Pat. No. 3,147,228 (1964) discloses various ways of carrying out a sequence, which consists of a regeneration to burn off carconaceous deposits from a conversion catalyst sulfiding such a regenerated catalyst and oxidizing the sulfided catalyst to convert metal sulfides to water dispersible form. The oxidation is preferably in an anhydrous condition meaning no separate liquid phase.

U.S. Pat. No. 3,150,072 (1964) of W. E. Watson discloses an aqueous phase oxidation of a sulfided catalyst employing an aerated dilute nitric acid solution in water.

U.S. Pat. No. 3,168,459 (1961) of A. D. Anderson et al. discloses an oxidation either in the aqueous phase or gas phase of a sulfided contaminated cracking catalysts to remove metal contaminants.

U.S. Pat. No. 3,182,011 (1965) of B. S. Friedman discloses an aqueous phase oxidation of a sulfided and previously regenerated cracking catalyst wherein peroxide oxidizing agents are used.

U.S. Pat. No. 3,252,981 (1966) of W. L. Disegna et al. discloses an improved method of oxidizing a regenerated catalyst to promote the removal of vanadium from a synthetic gel, silica-base cracking catalyst. The improvement involves adding an oxide of nitrogen to a molecular oxygen gas phase oxidation of a regenerated catalyst to promote vanadium removal.

A commercial catalyst demetallization process is disclosed in an article entitled "DeMet Improves FCC Yields" appearing in *The Oil and Gas Journal* of Aug. 27, 1962, pp. 92-96 and in an article entitled "The Demetallization of Cracking Catalysts" appearing in *I & E C Product Research and Development*, Vol. 2, pp. 328-332, December, 1963. This process while successful in accomplishing its intended purpose with the catalysts described encountered metal corrosion problems in conjunction with the chlorination reactions involved. In addition, this process utilizes a sulfidation pretreatment step which places in excess of 2.0 wt % sulfur on the catalyst. In subsequent steps, this sulfur as it is removed from the catalyst, can be converted to elemental sulfur which, in turn, can deposit in the reactor and transfer lines. These deposits can accumulate to excessive levels and lead to plugging of the reactor lines.

Nowhere is there disclosed in any of the cited prior art the use or the advantages from the use of a nitrite catalyzed nitrate oxidation in an aqueous phase of a sulfided cracking or chemical conversion catalyst.

Commercially used hydrocarbon cracking catalysts are the result of years of study and research into the nature of cracking catalysts. The cost of these catalysts frequently makes highly poisoned hydrocarbon feedstocks, even though they may be in plentiful supply, less desirable to use in cracking operations because of their tendency to deactivate valuable catalysts. These preferred catalysts, because of their composition, structure, porosity and other characteristics give optimum results in cracking. It is important, therefore, that removing poisoning metals from the catalyst does not substantially adversely affect the desired chemical and physical constitution of the catalyst. Although methods have been suggested in the past for removing poisoning metals from a catalyst which has been used for high temperature hydrocarbon conversions, the process of this invention is particularly effective to remove nickel while substantially maintaining the effectiveness and composition of the catalyst.

Solid oxide catalysts have long been recognized as useful in catalytically promoting the conversion of hydrocarbons. For hydrocarbon cracking processes carried out in the substantial absence of added free molecular hydrogen, suitable catalysts can include amorphous silica alumina catalysts which are usually activated or calcined predominately silica or silica-based, e.g., silica-alumina, silica-magnesia, silica-zirconia, etc., compositions in a state of slight hydration and containing small amounts of acidic oxide promoters in many instances. The oxide catalyst may contain a substantial amount of a gel or gelatinous precipitate comprising a major portion of silica and at least one other inorganic oxide material, such as alumina, zirconia, etc. These oxides may also contain small amounts of other inorganic materials. The use of wholly or partially synthetic gel or gelatinous catalyst, which are uniform and little damaged by high temperatures in treatment and regeneration is often preferable.

Also suitable are hydrocarbon cracking catalysts which include a catalytically effective amount of at least one natural or synthetic zeolite, e.g., crystalline alumino silicate. A preferred catalyst is one that includes at least one zeolite to provide a high activity catalyst. Suitable amounts of zeolite in the catalyst are in the range of about 1-75% by weight. Preferred are zeolite amounts of about 2-30% by weight of the total catalyst. Catalysts which can withstand the conditions of both hydrocarbon cracking and catalyst regeneration are suitable for use in the process of this invention. For example, a phosphate silica-alumina silicate composition is shown in U.S. Pat. No. 3,867,279, chrysotile catalysts are shown in U.S. Pat. No. 3,868,316, and a zeolite beta type of catalyst is shown in No. Re. 28,341. The catalyst may be only partially of synthetic material; for example, it may be made by the precipitation of silica-alumina on clay, such as kaolinite or halloysite. One such semi-synthetic catalyst contains about equal amounts of silica-alumina gel and clay.

The manufacture of synthetic gel catalyst is conventional, well known in the art and can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalyst may be produced by a combination of hydrated silica with other hydrate bases as, for instance, zirconia, etc. These synthetic gel-type catalyst may be activated or calcined before use.

A particularly preferred catalyst contains a catalytically effective amount of a decationized zeolitic molecular sieve having less than 90% of the aluminum atoms associated with cations, a crystalline structure capable of internally absorbing benzene and a $SiO_2$ to $Al_2O_3$ molar ratio greater than 3. Such catalysts are illustrated in U.S. Pat. No. 3,236,761, the teachings of which are incorporated by reference herein.

The physical form of the catalyst is not critical to the present invention and may, for example, vary with the type of manipulative process in which it will be used. The catalyst may be used as a fixed bed or in a circulating system. In a fixed-bed process, a single reaction zone or a series of catalytic reaction zones may be used. If a series of reactors are used, one is usually on stream and others are in the process of cleaning, regeneration, etc. In circulating catalyst systems, such as those of the fluid bed or moving bed catalytic processes, catalyst moves through a reaction zone and then through a regeneration zone. In a fluid bed cracking process, gases are used to convey the catalyst and to keep it in the form of a dense turbulent bed which has no definite upper interface between the dense (solid) phase the suspended (gaseous) phase mixture of catalyst and gas. This type of processing requires the catalyst to be in the form of a fine powder, e.g., a major amount by weight of which being in a size range of about 20 to 150 microns. In other processes, e.g., moving bed catalytic cracking system, the catalyst can be in the form of macrosize particles such as spherical beads which are conveyed between the reaction zone and the catalyst regeneration zone. These beads may range in size up to about ½" in diameter. When fresh, the minimum size bead is preferably about ⅛". Other physical forms of catalyst such as tablets, extruded pellets, etc. can be used.

In this invention the hydrocarbon petroleum oils utilized as feedstock for a given conversion process may be of any desired type normally utilized in such hydrocarbon conversion operations. The feedstock may contain nickel, iron and/or vanadium as well as other metals. As indicated, the catalyst may be used to promote the desired hydrocarbon conversion by employing at least one fixed bed, moving bed or fluidized bed (dense or dilute phase) of such catalyst. Bottoms from hydrocarbon processes, (i.e., reduced crude and residuum stocks) are particularly highly contaminated with these metals and therefore rapidly poison catalysts used in converting bottoms to more valuable products. For example, a bottom may contain about 100–1500 ppm Ni, about 100–2500 ppm V and about 100–3000 ppm Fe. For typical operations, the catalytic cracking of the hydrocarbon feed would often result in a conversion of about 10 to 80% by volume of the feedstock into lower boiling, more valuable products.

BRIEF DESCRIPTION OF THE INVENTION

It is an object of this invention to provide an improved process for removing metal contaminants such as vanadium, iron, copper, and especially nickel from a sulfided and regenerated conversion catalyst contaminated with such metal contaminants.

It is an object of this invention to provide an improvement to a hydrocarbon conversion process which employees an aqueous phase oxidation.

Other objects of this invention will be clear to one with skill in the art based upon this specification.

Broadly, the above objects have been found to be achievable by an aqueous phase oxidation of a sulfided conversion catalyst containing sulfided components.

More specifically, the aqueous phase oxidation involves an aqueous solution comprising nitrate ions and nitrite ions. An effective concentration of nitrate ions is one sufficient under the catalytic influence of nitrite ions for converting at least a portion of the sulfided components of the conversion catalyst to an aqueous phase dispersible material. A "dispersible material" is intended here and throughout the specification and the claims to cover both a soluble and/or a colloidally dispersible material.

A catalytically effective concentration of nitrite ions will vary depending upon the concentration of nitrate ions and the severity of metals contamination. Generally a catalytically effective concentration of nitrite ions is one sufficient for initiating the nitrate ion oxidation reaction which converts sulfided components of a conversion catalyst to a water or aqueous phase dispersible material at relatively lower temperatures. Generally, a catalytically effective concentration of nitrite ions is present in the aqueous phase when the ratio and moles of nitrate ions to nitrite ions is in the range of about 100:1 to about 10,000:1. An excess of nitrite ions does not appear to significantly impact the oxidation reaction, but is undesirable from an economic standpoint.

Nitrate ion concentration in moles per liter of solution in the range of about 0.1 to about 10 moles per liter is an effective concentration for converting at least a portion of the sulfided components on a conversion catalyst to a dispersible material. Alternatively for example, the concentration of nitrate ions in the form of metal nitrate salts to a contaminated catalyst, which is being treated in a slurry containing a percent by weight of solids in the range of about 15% to about 75% by weight is in the range of about 200 to about 600 pounds of metal nitrate calculated as based on the nitrate alone per ton of catalyst.

The aqueous phase is preferably substantially free of contaminating metals such as nickel, vanadium, iron or copper, or other known metal catalyst poisons. Distilled or de-ionized water has been found useful in this invention. However, the presence of aluminum ions in the aqueous phase are beneficial, especially in the case of a supported conversion catalyst containing reacted aluminum. The desired concentration of aluminum ions in solution is one sufficient to suppress the tendency of reacted aluminum in the support to dissolve into the aqueous phase. A concentration found suitable for this purpose is generally in the range of about 0.05 to about 3 moles per liter. Clearly, all other factors being equal, such as pH, the lower the aluminum ion concentration, the less effective will be the common ion effect in suppressing dissolution of some of the reacted aluminum from a support. Higher concentrations on the other hand are undesirable from an economic point of view. Provided the pH of the solution is in the range of about 2 to 4, and preferably 2.5 to 3.5 problems from aluminum ions precipitating from the solution onto the catalyst are avoided.

The reaction temperature for carrying out the aqueous phase oxidation is not critical but should be sufficient to maintain a reasonable reaction rate. A temperature in the range of about 40° F. to about 200° F. and preferably about 80° F. to about 170° F. has been found satisfactory.

An effective concentration of sulfur on the sulfided catalyst will vary depending upon the extent of metal contamination. Preferably, the sulfur concentration is in the range of about 40 percent to about 75 percent of the weight percent of all of the metal contaminants present in the catalyst prior to sulfidation.

The present invention is particularly suitable for demetallizing catalysts utilized in the catalytic cracking of reduced or topped crude oils to more valuable products such as illustrated in U.S. Pat. Nos. 3,092,568 and 3,164,542. The teachings of which are incorporated by reference herein. Similarly, this invention is applicable to processing shale oils, tar sands oil, coal oils and the like where metal contamination of the processing, e.g., cracking catalyst, can occur.

A catalytic conversion process as described typically includes a regeneration procedure in which the catalyst is contacted periodically with free oxygen-containing gas in order to restore or maintain the activity of the catalyst by removing at least a portion of the carbonaceous deposits from the catalyst which form during hydrocarbon conversion. However, in those processes not having a regeneration step, the catalyst can be subjected to a regenerating step after the removal of the catalyst from the process. It will be understood that "regeneration" involves a carbonaceous material burn-off procedure. Ordinarily, the catalysts are taken from the hydrocarbon conversion system and treated before the poisoning metals have reached an undesirably high level, for instance, above about 0.5% by weight, on catalyst and preferably less than about 10% maximum, content of nickel, iron and vanadium. More preferably, the catalyst is removed when the nickel, iron and vanadium content is less than about 5% by weight and most preferably when the catalyst contains about 0.75% to about 2% by weight nickel, iron and vanadium. Generally speaking, when the hydrocarbon conversion levels, i.e. more than about 50% by volume (of the feedstock) conversion, the amount of metals tolerated on the catalyst is less. On the other hand, low conversion levels, i.e. less than about 50% by volume conversion, tolerate higher amounts of metals on the catalyst.

The actual time or extent of the regeneration thus depends on various factors and is dependent on, for example, the extent of metals content in the feed, the level of conversion, unit tolerance for poison, the sensitivity of the particular catalyst toward the demetallization procedure used to remove metals from the catalyst, etc.

Regeneration of a hydrocarbon cracking catalyst to remove carbonaceous deposit material is conventional and well known in the art. For example, in a typical fluidized bed cracking unit, a portion of catalyst is continually being removed from the reactor and sent to the regenerator for contact with an oxygen-containing gas at about 950° to about 1220° F., preferably about 1000° to about 1150° F. Combustion of carbonaceous deposits from the catalyst is rapid, and, for reasons of economy, air is used to supply the needed oxygen. Average residence time a catalyst particle in the regenerator can be on the order of about three to one hundred minutes, preferably about three minutes to sixty minutes and the oxygen content of the effluent gases from the regenerator is desirably less than about 0.5 weight %. When later oxygen treatment is employed, the regeneration of any particular quantity of catalyst is generally regulated to give a carbon content remaining on the catalyst of less than 0.5 weight%.

The conversion of the metals to a metal sulfur containing compound can be performed by contacting the poisoned catalyst with elemental sulfur vapors, or more conveniently by contacting the poisoned catalyst with a volatile sulfide, (including one or more components capable of generating volatile sulfide at the contacting conditions), such as $H_2S$, $CS_2$ or a mercaptan at an elevated temperature generally in the range of about 500° to 1700° F., preferably about 800° to 1400° F., and a sulfiding vapor partial pressure of about 0.5 to 30 atmospheres or more, preferably from about 0.2 to 25 atmospheres. Hydrogen sulfide is in the preferred sulfiding agent. Pressures below atmospheric can be obtained either by using a partial vacuum or by diluting the vapor with a gas such as hydrogen or nitrogen. Particularly preferred are mixtures of hydrogen sulfide with hydrogen and/or carbon monoxide and/or carbon dioxide. The time of contact varies on the basis of the temperature and pressure chosen and other factors such as the amount of metal to be removed. Such contacting may run for up to about 20 hours or more, preferably about ¼ to 20 hours depending on these conditions and the severity of the poisoning. Temperatures of from about 900° 1350° F. and pressures approximately 1 atmosphere or less are preferred. More preferably such contacting continues for at least about 1 to 2 hours but the time, of course can depend upon the manner of contacting the catalyst and sulfur-containing agent and the nature of the contacting system, e.g. batch or continuous, as well as the rate of diffusion within the catalyst matrix.

Preferably the amount of sulfur added to the catalyst is a function of the total metals on the catalyst. For example, it is preferred that the weight % sulfur on the catalyst after contacting with the sulfur-containing agent be about 40–75% of the weight % of the total nickel, vanadium and iron on the catalyst. Studies have shown that catalysts containing about 1.5 to 2.0 weight % of these metals should contain about 1.0 to 1.5% sulfur after this contacting step to ensure effective metals removal in subsequent steps of the process.

The contacting with sulfur-containing agent converts at least a portion of the catalyst metal poisons to sulfur-containing metal compounds and also appears to concentrate some metal poisons, especially nickel, at the surface of the catalyst particle.

After converting at least a portion of the sulfur-containing metal compound on the catalyst, to a removable form, at least a portion of the metal poison is removed by contacting, e.g., washing, the catalyst with a liquid aqueous medium. For example, the catalyst may be washed with an aqueous solution or an acidic aqueous solution such as an aqueous solution of $HNO_3$, $H_2SO_4$, HCl, and the like. The acidity of the wash solutions, however, and wash times should be selected to insure that excessive amounts of $Al_2O_3$, if present, are not removed from the catalyst. Suitable acidic aqueous solutions are dilute aqueous solutions having a pH in the range of about 2 to 5.

A preferred washing method utilizes a reductive wash, which is preferably followed by an oxidative wash. The washes may be given alternately or several reductive washes may be followed by several oxidative washes. When alternating washes are used, the final wash is preferably an oxidative wash to leave the catalyst in the best form for hydrocarbon conversion, e.g., cracking. As used herein, "reductive" wash refers to a wash with an aqueous solution containing a reducing agent or an agent which may given up electrons. Similarly, "oxidative" wash refers to a wash with an aqueous solution containing an oxidizing agent or an agent which may accept electrons. The contacting of a catalyst with either an oxidative or a reductive wash may be a batch operation, a semi-continuous operation or a continuous operation. Thus, a "wash" may include merely stirring in a batch vessel or a complex series of counter current contactors or continuous contactors.

A preferred reductive wash medium comprises a solution of sulfur dioxide or compounds capable of producing sulfur dioxide such as bisulfite and/or sulfite salts in an acidic aqueous medium. Other reducing agents which may be used include hydrogen, carbon monoxide, hydrogen sulfide, oxalic acid or salts thereof, hydrazine and hydrazine derivatives, borane, diborane, borohydrides, metallic aluminum hydrides, sulfites, thiosulfates, dithionites, polythionites and the like. Sulfur dioxide is preferred since it provides sufficient temporary acidity without risking substantial alumina removal, it provides sufficient reducing power and it produces stable anions of added free molecular oxygen. In addition, reductive washes with $SO_2$ provide for improved solubility of elemental sulfur which may have been deposited on the catalyst during contact with the sulfur-containing agent. Such elemental sulfur deposited on the catalyst can act to reduce the degree of demetallization produced from the present process. Therefore, solubilization of such sulfur is an additional benefit of a reductive wash with $SO_2$. By way of example of a preferred reductive wash, an aqueous solution saturated with sulfur dioxide to form a sulfur oxide hydrate (i.e. $SO_2 \cdot xH_2O$) is prepared at about 32°–68° F. preferably about 10°–60° F., by bubbling $SO_2$ through water. An aqueous, e.g., about 10–50% and preferably about 15–25% by weight catalyst slurry in water is prepared and heated to a temperature of about 110°–203° F., preferably 119°–176° F. The $SO_2$ saturated solution is then added to the catalyst slurry in an amount sufficient to give an initial pH of the system in the range of about 2.0 to about 3.5 and preferably about 2.5 to 3.0. Preferably, about 0.1 to about 10 volumes of $SO_2$ saturated solution per volume of catalyst are used during the wash. After the contacting has occurred for about 0.5–10 minutes, preferably about 1–5 minutes, preferably under an inert atmosphere, the demetallized catalyst can be separated, e.g., by filtration or decanting. Long contact times, i.e., in excess of about 10 minutes, are preferably avoided to minimize metals redeposition on the catalyst and to avoid oxidation of the $SO_2$ should the wash be effected in a manner where air and oxygen are not intentionally excluded. This reductive wash step can be followed by a water wash.

As indicated, the reductive wash is preferably followed by an oxidative wash. A preferred oxidative wash medium comprises a solution of hydrogen peroxide in water. Other oxidizing agents which may be used include air, oxygen, ozone, perchlorates, organic hydroperoxides, organic peroxides, organic peracids, inorganic peroxyacids such as peroxymonosulfuric and peroxydisulfuric acid, singlet oxygen, $NO_2$, $N_2O_4$, $N_2O_3$, superoxides and the like. Typical examples of organic oxidants are hydroxyheptyl peroxide, cyclohexanone peroxide, tertiary butyl peracetate, di-tertiary butyl diperphthalate, tertiary butyl perbenzoate, methyl ethyl hydroperoxide, di-tertiary butyl peroxide, p-methyl benzene hydroperoxide, pinane hydroperoxide, 2,5-dimethylhexane-2,5-dihydroperoxide, cumene hydroperoxide and the like; as well as organic peracids such as performic acid, peracetic acid, trichloroperacetic acid, perchloric acid, periodic acid, perbenzoic acid, perphthalic acid and the like including salts thereof. Ambient oxidative wash temperatures can be used, but temperatures of about 150° F. to the boiling point of the aqueous solution in combination with agitation are helpful in increasing dispersibility or removability of the metal poisons. Preferred temperatures are about 119° to about 203° F. Pressure above atmospheric may be used but the results usually do not justify the additional equipment. Contact times similar to the contact times for the reductive wash such as from about several seconds to about half an hour are usually sufficient for poisoning metal removal.

As indicated, preferably, the reductive wash is followed by a hydrogen peroxide-water oxidative wash. The hydrogen peroxide solution preferably containing about 2 to 30 weight % hydrogen peroxide, can be added to an aqueous catalyst slurry as described earlier at about 119°–203° F., preferably 110°–185° F. and allowed to react for a time sufficient to solubilize at least a portion of the vanadium. Preferred wash times are about 1–5 minutes. As a result, if contact times are unnecessarily prolonged, this species can decompose and redeposit vanadium on the catalyst. A concentration of $H_2O_2$ in the range of about 5–50 lb., preferably about 10–20 lb. of $H_2O_2$/ton of catalyst is preferably used. Additional oxidative washes can be used to ensure efficient removal of metal and the restoration of catalytic properties. In addition, the oxidative washing can be carried out either in the presence of or absence of a mineral acid such as HCl, $HNO_3$ or $H_2SO_4$. Preferably the pH of the oxidative wash medium is about 2 to about 6. Alternating catalyst washing using reductive and oxidative solutions can be used. If alternative washes are used, it is preferred that the last wash be an oxidative wash.

After the catalyst is washed, the catalyst slurry can be filtered to give a cake. The cake may be reslurried one or more times with water or rinsed in other ways, such as, for example, by a water wash of the filter cake.

After the washing and rinsing treatment which may be used in the catalyst demetallization procedure, the catalyst is transferred to a hydrocarbon conversion system, for instance, to a catalyst regenerator. The catalyst may be returned as a slurry in the final aqueous wash medium, or it may be desirable first to dry the catalyst filter cake or filter cake slurry at, for example, about 215° to 320° F., under a vacuum. Also, prior to reusing the catalyst in the conversion operation it can be calcined, for example, at temperatures usually in the range of about 700° F. to about 1300° F. The catalyst may also be slurried with hdyrocarbons and added back to the reactor vessel, if desired.

A fluidized solids technique is preferred for the vapor contact processes used in any selected demetallization procedure as a way to shorten the time requirements. If desired, additional metals removal may be obtained by repeating the demetallization sequence or using other known treatment processes. Inert gases frequently may be employed after contact with reactive vapors to remove any of these vapors entrained in the catalyst or to purge the catalyst of reaction products.

The catalyst to be treated may be removed from the hydrocarbon conversion system—that is, the stream of catalyst which, in most conventional procedures is cycled between conversion and regenerating operations—before the poison content reaches about 100,000 ppm, the poisoning metals, e.g., nickel, vanadium and iron, being calculated as elemental metals. Generally, at least about 5,000 to about 20,000 ppm. metals will be accumulated on the catalyst before demetallization is warranted. The treatment of this invention is effective despite the presence of a small amount of carbonaceous material on the treated catalyst, but preferably catalyst regeneration is continued until the catalyst contains not more than about 0.5% carbonaceous material.

The amount of nickel, vanadium and/or iron removed in practicing the procedures outlined or the proportions of each may be varied by proper choice of treating conditions. It may prove necessary, in the case of very severly poisoned catalyst, to repeat the treatment to reduce the metals to an acceptable level, perhaps with variations when one metal is greatly in excess. A further significant advantage of the process lies in the fact that the overall metals removal operation even if repeated, does not unduly deleteriously affect the activity, selectivity, pore structure and other desirable characteristics of the catalyst. Any given step in the demetallization treatment is usually continued for a time sufficient to effect a meaningful conversion or removal of poisoning metal and ultimately results in a substantial increase in metals removal compared with that which would have been removed if the particular step had not been performed. Generally, a process with at least one of both a reductive and an oxidative wash will provide greater than about a 50 weight % reduction in nickel, about 20 weight % reduction in vanadium and about 30 weight % reduction in iron. Such processing preferably provides about 70-90 weight % reduction in nickel, about 30-70 weight % reduction in vanadium and about 39-75 weight % reduction in iron when the catalyst initially contains as much as about 0.1 to 0.5 weight % nickel, about 0.3 to 1.0 weight % vanadium and about 0.2 to 1.2 weight % of iron.

In practice, the process of the present invention can be applied by removing a portion of catalyst from the regenerator or regenerator standpipe of a hydrocarbon conversion unit, e.g., cracking system, after a standard regeneration treatment to remove at least a portion of the carbonaceous material from the catalyst, converting the metals to a metal sulfur containing compound, cooling and oxidizing the catalyst, slurrying the catalyst for a reductive wash, filtering, and reslurrying the catalyst for an oxidative wash, filtering and rinsing with water. The treated catalyst can be returned to the unit, for example, to the regenerator or slurried in hydrocarbons to be returned to the reactor.

The following examples are illustrative of the invention, but variations on them based upon the teachings of this disclosure are apparent to one of skill in the art and are intended to be part of this invention.

EXAMPLES

A Phillips Borger equilibrium silica-alumina zeolite-containing cracking catalyst was treated in accordance with the present invention. This catalyst includes about 5% by weight of crystalline alumino-silicate effective to promote hydrocarbon cracking and has an initial catalytic activity as follows:

| Catalytic Activity | | |
|---|---|---|
| MA | CPF | $H_2/CH_4$ |
| 80 | 0.75 | 80 |

The catalyst as above was used in a fluid catalytic cracking conversion of hydrocarbon feedstock contaminated with iron, nickel and vanadium. The metal contaminated catalyst was removed from the hydrocarbon conversion stream with the following metal content (based on elemental metals):

| Contaminated Catalyst | Nickel | 2,800 ppm |
|---|---|---|
| | Vanadium | 6,300 ppm |

-continued

| | Iron | 7,500 ppm |
|---|---|---|
| | Ni, V, Fe | 16,600 ppm | and a catalytic activity of:

| Catalytic Activity | | |
|---|---|---|
| MA | CPF | $H_2/CH_4$ |
| 59.1 | 3.02 | 20.0 |

A slight exotherm of 1015° F. was noticed when hydrogen sulfide with $N_2$ as a diluent (100-10:0-80 $H_2S$ to $N_2$ ratio) was first introduced to catalyst. The hydrogen sulfide was held constant for four hours at a temperature of 1350° F. At the end of the fourth hour the addition of hydrogen sulfide was terminated and the catalyst allowed to cool under nitrogen flow to approximately 500° F. Sulfur level on the thus treated catalyst at this point was between 1.0 and 1.3%, i.e. the weight percent sulfur on the catalyst is about 60 to 75% of total amount of nickel, iron, and vanadium on the catalyst.

After sulfidation, the catalyst was subjected to a liquid phase nitrate oxidation wherein the metal ion used was aluminum. The concentration of $Al(NO_3)_3$ employed was about 0.5 to about 1.5 mole/liter. The slurry concentration of the catalyst in the aqueous oxidation medium was about 20 weight percent to 25 weight percent. The oxidation was initiated with a trace amount of sodium nitrite, i.e. about 0.04 pounds of sodium nitrate/ton of catalyst and was carried out at 80° C. for about 10-15 minutes. The catalyst was then thoroughly washed with water. In runs 1, 4, 5, and 7 reductive ($SO_2$) and oxidation washes were employed using wet catalysts from the nitrate oxidation step.

Effect of additional nitric acid on the nitric oxidation system was shown in run 3 and 4. The same result was provided in run 5 and 6. There is no beneficial effect of additional $HNO_3$ presence for the metal removal and catalytic activity. The pH of the nitrate system varied from about 2.5 to less than 1 by the presence of additional nitric acid. At the low pH, the cracking catalyst readily deteriorated because excessive alumina is dissolved out of the catalyst. However, in metal nitrate solution (pH $\approx$ 2.5), the alumina dissolution problem can effectively be minimized and demetallization can be satisfactorily carried out.

The catalyst was slurried with water to give about a 20 weight percent solids slurry and sufficient sulfur dioxide was added to given an initial pH of 2.0. The temperature was maintained at about 158° F. for about three minutes. The catalyst was then filtered and the aqueous sulfur dioxide wash was repeated twice more to give a total of three reductive washes.

The catalyst wash then slurried with water to give about a 20% solids slurry and hydrogen peroxide at the rate of 10-20 lg./ton of catalyst was added. The pH was initially about 2.8-3.3 and the temperature was about 176° F. Again the wash was carried out for three minutes and the hydrogen peroxide wash was repeated once more to give a total of two oxidative washes. The catalyst was washed with water forming a 20% slurry twice, filtered and then dried under vacuum at about 212°-320° F.

TABLE I

| Example No. | 1 | 2 | 3 | 4 | 5 | 6 | 7 |
|---|---|---|---|---|---|---|---|
| Sulfided Catalyst, % S | 1.13 | 1.61 | 1.61 | 1.61 | 1.61 | 1.61 | 1.13 |
| Nitrate Oxidation* | | | | | | | |
| Mole/l, $Al(NO_3)_3$ 9 $H_2O$ | 1.52 | 0.05 | 0.10 | 0.10 | 0.15 | 0.15 | 0.30 |
| $HNO_3$ addition (#/ton cat.) | 0 | 0 | 0 | 100 | 0 | 100 | 0 |
| pH of medium | — | 2.62 | 2.52 | 0.80 | 2.45 | 0.83 | 2.35 |
| **% Metal Removal | | | | | | | |
| Ni | 72 | 14 | 72 | 69 | 72 | 72 | 72 |
| Fe | 4 | 3 | 0 | 0 | 4 | 1 | 5 |
| V | 15 | 22 | 14 | 14 | 15 | 19 | 24 |
| S | 77 | 27 | 76 | 75 | 77 | 74 | 75 |
| Cat. Activity | | | | | | | |
| MA | 62.7 | — | — | — | 62.7 | 61.7 | 62.3 |
| CPF | 2.24 | — | — | — | 2.24 | 2.25 | 2.30 |
| $H_2/CH_4$ | 21.5 | — | — | — | 21.5 | 22.6 | 21.2 |
| Reductive ($SO_2$) and Oxidative Wash | Yes | No | No | Yes | Yes | No | Yes |
| **% Metal Removal | | | | | | | |
| Ni | 92 | | | 86 | 86 | | 87 |
| Fe | 58 | | | 53 | 51 | | 53 |
| V | 61 | | | 57 | 52 | | 49 |
| S | 87 | | | 94 | 80 | | 83 |
| Cat. Activity | | | | | | | |
| MA | 75.0 | | | 63.1 | 67.7 | | 71.1 |
| CPF | 1.11 | | | 1.16 | 1.46 | | 1.96 |
| $H_2/CH_4$ | 6.87 | | | 7.82 | 9.42 | | 6.96 |

*Oxidation was initiated with $Al(NO_2)_3$ or $NH_4NO_2$.
**% metal removal is based upon total metal contaminants of metal contaminated catalyst after regeneration.

The embodiments of this invention in which an exclusive property or privilege is claimed are defined as follows:

1. A process for an aqueous phase oxidation of a sulfided and metals contaiminated conversion catalyst containing sulfided components to convert at least a portion of said sulfided components to a water dispersible material comprising: treating said sulfided and metals contaminated catalyst in a slurry comprising an effective amount of soluble nitrate ions in the presence of a catalytically effective concentration of nitrite ions at a temperature and for a time sufficient to cause said oxidation of at least a portion of said sulfided components to produce said water dispersible material, and separating from said slurry a conversion catalyst having a reduced amount of metal contaminants.

2. The process of claim 1, wherein the nitrate ion concentration in moles per liter of solution is in the range of about 0.1 to about 10 moles per liter of solution and the ratio in moles of the nitrate ion concentration to nitrite ion concentration is in the range of about 100:1 to about 10,000:1.

3. The process of claim 2, wherein said slurry contains a percent by weight of solids in the range of about 5 to about 60 percent by weight based upon the total weight of said slurry.

4. The process of claim 1, wherein the sulfided catalyst contains sulfur in weight percent equal to about 40 percent to about 75 percent of the weight percent of the total of metal contaminants on the catalyst.

5. The process of claim 1, 2, 3 or 4, wherein said conversion catalyst having a reduced amount of metal contaminants is further treated with at least one oxidation wash comprising an aqueous peroxide solution.

6. The process of claim 1, 2, 3 or 4, wherein said conversion catalyst having a reduced amount of metal contaminants is further treated with at least one reductive wash to produce a reductively washed catalyst.

7. The process of claim 6, wherein said reductively washed catalyst is further treated with an oxidative wash.

8. The process of claim 6, wherein said reductive wash is an aqueous solution of $SO_2$.

9. In a process for converting a hydrocarbon feedstock containing metal contaminants comprising: contacting said hydrocarbon feedstock with a catalyst capable of converting said hydrocarbon feedstock at hydrocarbon conversion conditions in a conversion zone to useful conversion products, and forming carbonaceous deposits on said catalyst wherein at least a portion of said catalyst becomes contaiminated with metal contaminants, thereby forming a deactivated metal-containing catalyst; regenerating at least a portion of said deactivated metal-containing catalyst with an oxygen-containing vaporous medium at conditions, including elevated temperature, to remove at least a portion of said carbonaceous deposits, thereby regenerating at least a portion of the hydrocarbon conversion activity of said catalyst and to provide a regenerated metal-containing catalyst; sulfiding at least a portion of said regenerated metal-containing catalyst with a sulfur-containing vaporous medium at conditions including elevated temperature, thereby providing a sulfided catalyst containing sulfided components, and oxidizing in an aqueous medium said sulfided catalyst to convert said sulfided components to a material dispersible in said aqueous medium; wherein the improvement in said process comprises an improvement to said oxidizing in an aqueous medium, said oxidizing comprising contacting a sulfided and metals-contaminated catalyst with an aqueous solution comprising an effective amount of nitrate ions and a catalytically effective concentration of nitrate ions at a temperature and for a time sufficient to cause said oxidizing of at least a portion of said sulfided components to produce said water dispersible material and separating a conversion catalyst having a reduced amount of metal contaminants.

10. The process of claim 9, wherein said catalyst having a reduced amount of metal contaminants is treated with at least one oxidative wash comprising an aqueous peroxide solution.

11. The process of claim 9, wherein said conversion catalyst having a reduced amount of metal contaminants is treated with at least one reductive wash.

* * * * *